United States Patent
Kawasaki et al.

(10) Patent No.: US 8,512,436 B2
(45) Date of Patent: Aug. 20, 2013

(54) METAL FINE PARTICLES AND MANUFACTURING METHOD THEREFOR

(75) Inventors: Mitsuo Kawasaki, Kyoto (JP); Osamu Kajita, Kyoto (JP); Ayu Onishi, Kyoto (JP); Sachiko Masuoka, Kyoto (JP); Takafumi Iwamoto, Kyoto (JP); Eitaro Yasuda, Kyoto (JP)

(73) Assignees: Kyoto University, Kyoto (JP); Fukuda Metal Foil & Powder Co., Ltd., Kyoto (JP); Hitachi Chemical Company, Ltd., Tokyo (JP)

( * ) Notice: Subject to any disclaimer, the term of this patent is extended or adjusted under 35 U.S.C. 154(b) by 958 days.

(21) Appl. No.: 11/575,360

(22) PCT Filed: Aug. 22, 2005

(86) PCT No.: PCT/JP2005/015180
§ 371 (c)(1),
(2), (4) Date: Oct. 30, 2008

(87) PCT Pub. No.: WO2006/030605
PCT Pub. Date: Mar. 23, 2006

(65) Prior Publication Data
US 2009/0053523 A1 Feb. 26, 2009

(30) Foreign Application Priority Data
Sep. 15, 2004 (JP) .................................. 2004-268441
Jul. 21, 2005 (JP) .................................. 2005-210739

(51) Int. Cl.
*B22F 9/14* (2006.01)
*B82Y 40/00* (2011.01)

(52) U.S. Cl.
USPC .............................. 75/345; 75/361; 977/901

(58) Field of Classification Search
USPC ........................................................... 75/345
See application file for complete search history.

(56) References Cited

U.S. PATENT DOCUMENTS

| 4,877,647 A | 10/1989 | Klabunde |
| 5,980,785 A * | 11/1999 | Xi et al. ........................ 252/512 |

(Continued)

FOREIGN PATENT DOCUMENTS

| EP | 0241876 | 10/1987 |
| JP | 62-255134 | 11/1987 |

(Continued)

OTHER PUBLICATIONS

Mafune, F. et al., "Formation and Size Control of Silver Nanoparticles by Laser Ablation in Aqueous Solution", J.Phys. Chem.B., vol. 104, pp. 9111-9117, published Sep. 7, 2000.*

(Continued)

*Primary Examiner* — George Wyszomierski
(74) *Attorney, Agent, or Firm* — Antonelli, Terry, Stout & Kraus, LLP.

(57) ABSTRACT

There is provided a method for efficiently manufacturing metal nano particles without condensing laser beams by using a lens etc. In this method, first, metallic foil pieces, which are a starting material, are dispersed in a dispersion liquid. Next, laser beams are irradiated directly to the metallic foil pieces without providing a condensing means, by which many metal fine particles are yielded. The particle diameters of the metal fine particles obtained can be controlled to sizes from nano particles to submicron particles by utilizing the relationship between the shape (especially thickness) of the metallic foil piece which is a starting material and the absorbed energy of the laser beam.

11 Claims, 10 Drawing Sheets

(56) References Cited

U.S. PATENT DOCUMENTS

| | | | |
|---|---|---|---|
| 6,084,059 A | 7/2000 | Matsushita et al. | |
| 2006/0278844 A1* | 12/2006 | Tung | 252/67 |

FOREIGN PATENT DOCUMENTS

| | | |
|---|---|---|
| JP | 04-063203 | 2/1992 |
| JP | 06-017105 | 1/1994 |
| JP | 08-006128 | 1/1996 |
| JP | 09-020903 | 1/1997 |
| JP | 2001-113159 | 4/2001 |
| JP | 2004-090081 | 3/2004 |
| JP | 2004-162169 | 6/2004 |
| WO | WO 99/51610 | 10/1999 |

OTHER PUBLICATIONS

Zhang, J. et al., "Synthesis of Metal Alloy Nanoparticles in Solution by Laser Irradiation of a Metal Powder Suspension", J.Phys.Chem. B., vol. 107, pp. 6920-6923, published Jun. 7, 2003.*

* cited by examiner (a)

~0.6 μm —14

(b)

(a)

(b)

(c)

(d)

(e)

(f)

(g)

(h)

(a)

(b)

(a)

(b)

(c)

(d)

(a)

(b)

(c)

(d)

(a)

(b)

(c)

(d)

(e)

(a)

(b)

(c)

(d)

METAL FINE PARTICLES AND MANUFACTURING METHOD THEREFOR

TECHNICAL FIELD

The present invention relates to a method for manufacturing metal fine particles efficiently and others.

BACKGROUND ART

Since metal fine particles each having a size of several nanometers to several hundred nanometers have unique optical characteristics, electrical characteristics, magnetic characteristics, catalytic action, and the like, the manufacturing method therefor has attracted attention as a key technology for developing new materials and substances in various fields such as industrial materials and medical supplies. In this description, metal fine particles are broadly divided into "nano particles" and "submicron particles" according to the size thereof. For convenience, by definition, the nano particles are particles each having a particle diameter not smaller than 1 nm and smaller than 100 nm, and the submicron particles are particles each having a particle diameter not smaller than 100 nm and smaller than 1 μm. As particles each having a particle diameter smaller than 1 nm, there are molecule-form metal particles (referred to as "clusters"), "atoms", and the like.

As a method for manufacturing metal fine particles of a nanometer size, various methods are known. For example, Patent Document 1 describes a method in which high-output laser beams are condensed on a target disposed in a liquid to be treated using a lens and are irradiated, by which a colloidal solution containing nano particles is manufactured (this method is referred to as "laser ablation in solution").

Also, for example, Patent Document 2 describes a method for making solid organic compounds particulate by laser beams.

Patent Document 1: Japanese Patent Laid-Open No. 2004-90081
Patent Document 2: Japanese Patent Laid-Open No. 2001-113159
Non-Patent Document 1: J. Phys. Chem. B 2003.107, 6920-6923

DISCLOSURE OF THE INVENTION

In the case of laser ablation in solution, as the target substance, a bulk-shaped metal such as a metal plate is ordinarily used. Therefore, in order to momentarily evaporate the target substance by using laser beams, short-wavelength and high-output laser beams such as YAG laser must be condensed by an optical lens.

However, in order to efficiently manufacture fine particles by laser ablation in solution, a technique for precisely controlling the focus position of lens must be used (refer to Patent Document 1).

For this reason, the laser ablation in solution has a problem in that it is difficult to delicately control the laser irradiation position, and moreover, the yielding efficiency of nano particles is very low. Also, in the laser ablation in solution, high-energy pulses of a laser fluence (the energy density of pulses per unit area in a cross section of laser beam, in this description, referred to simply as "energy density") exceeding, for example, 10 J/cm$^2$ are irradiated to a metal. At this time, various particles (for example, atoms, clusters, etc.) are yielded in the solution, and combine and coalesce, so that nano particles grow. Because of such a mechanism, it is difficult to make the particle sizes uniform. Further, the fine particles in the solution are liable to aggregate, so that it is necessary to add a surface active agent or another substance as a "protecting agent" to restrain the aggregation.

As a method for manufacturing "alloy nano particles" that solves the above problems with the laser ablation in solution, a method for manufacturing alloys of nano particles by using a plurality of metal powders dispersed in a liquid as a starting material in place of the bulk metal target has been proposed (Non-Patent Document 1). In this case as well, however, there arises a problem in that a protecting agent must be added to restrain aggregation, and the sizes of the obtained nano particles are nonuniform. Further, in this method, only nano particles can be obtained, and submicron particles cannot be obtained.

The most desirable attribute practically required for the submicron particles or the nano particles is the uniformity including the particle size. Ideally, it is desirable that the submicron particles or the nano particles be particles that do not contain other additives (reducing agent and protecting agent), that is, that are chemically pure. However, as described above, the metal fine particles that meet the above requirements cannot be manufactured by the conventionally known method.

The main technical problem of the present invention is to provide a novel method for manufacturing metal fine particles efficiently.

A first manufacturing method for metal fine particles in accordance with the present invention is a method for manufacturing metal fine particles by using metallic foil pieces as a starting material, the first manufacturing method being characterized by including a step of dispersing the metallic foil pieces, which are a starting material, in a dispersion liquid, and a step of subsequently irradiating laser beams directly to the metallic foil pieces.

In this description, the term "direct irradiation" means that a beam condensing means need not be provided specially.

Also, in this description, the term "metallic foil piece" means a foil piece-shaped metal (flake) having a thickness not larger than 1 μm.

As described below, the particle diameters of the metal fine particles obtained can be controlled freely from the nano particles to the submicron particles by utilizing the relationship between the shape (especially thickness) of metallic foil piece which is a starting material and the absorbed energy of laser beams.

In this method, the energy density of laser beams irradiated to the metallic foil pieces must have at least a value not lower than an energy density $E_{th1}$[J/cm$^2$] necessary for allowing the metallic foil pieces to reach the vicinity of the melting point (the first condition).

According to this first condition, a large number of submicron particles each having a particle diameter on the order of several hundred nanometers are yielded in the dispersion liquid. The observation of these submicron particles using an optical microscope reveals that the submicron particles have a characteristic in that each of them has a spherical shape relatively close to a complete sphere. The submicron particles obtained in this manner are expected to be used in various applications including the raw material for conductive ink.

Further, the energy density of laser beams irradiated to the metallic foil pieces may have at least a value not lower than an energy density $E_{th2}$[J/cm$^2$] necessary for allowing the metallic foil pieces to reach the vicinity of the boiling point (the second condition).

According to this second condition, a large number of nano particles each having a particle diameter on the order of several nanometers to several tens nanometers are yielded in the dispersion liquid. That is to say, according to either of the first and second conditions, the particle diameters of metal fine particles can be controlled in the range of several nanometers to several hundred nanometers (nano particles to submicron particles).

Also, as a method different from the above-described method, which is used for manufacturing metal fine particles (metal nano particles) each having a particle diameter of several nanometers to several tens nanometers, metal fine particles can also be manufactured by irradiating laser beams having an energy density not lower than the energy density $E_{th2}[J/cm^2]$ necessary for allowing the metal fine particles to reach the vicinity of the boiling point to the metal fine particles each having a particle diameter of several hundred nanometers dispersed in the dispersion liquid.

That is to say, the laser beams having an energy density not lower than the energy density $E_{th2}[J/cm^2]$ may be irradiated directly from the state of metallic foil pieces, which are a starting substance. Also, metal nano particles can be manufactured by yielding submicron particles once under the first condition etc. and then by irradiating laser beams successively under the second condition.

According to this method, metal fine particles each having a particle diameter far smaller than that under the first condition (a large number of nano particles approximately on the order of several nanometers to several tens nanometers) are yielded in the dispersion liquid. Like the aforementioned submicron particles, these nano particles are also characterized by having a spherical shape close to a complete sphere. The nano particles obtained in this manner are expected to be used in various applications including the development of novel materials.

The dispersion liquid is preferably a solvent consisting of a compound having a functional group having an outstanding electron-donating property to a metal, preferably a solvent consisting of, for example, chain or cyclic ketone.

As described above, in the present invention, fine particles are yielded by a mechanism entirely different from that of the laser ablation in solution. Therefore, when laser beams are irradiated under the first or second condition as described above, unlike the laser ablation in solution, the laser beams need not be condensed to the target metal using a lens, and also the laser irradiation position need not be controlled. However, a lens may be used to regulate the necessary energy density.

A second manufacturing method for metal fine particles in accordance with the present invention is a method for manufacturing metal fine particles by using a metallic thin film as a starting material, the second manufacturing method being characterized by including a step of immersing a substrate the top surface of which is formed with the metallic foil film in an solvent, and a step of subsequently irradiating laser beams directly to the metallic thin film from the top surface or the back surface of the substrate without providing a beam condensing means. The term "direct irradiation" means that a beam condensing means need not be provided specially.

As described later, in the present invention, it is very important that the thickness of the metal, which is a starting material, be within a certain value. Compared with the case of metallic foil pieces, in the case where the thin film is formed on the substrate, the controllability of film thickness increases. In particular, on the top surface of the substrate, a ground glass substrate having a roughness, for example, on the order of several tens micrometers is preferably used.

First metal fine particles in accordance with the present invention are metal fine particles obtained by irradiating laser beams to metallic foil pieces or a metallic thin film in a dispersion liquid such as water, an alcohol-based solvent, a hydrophobic solvent, or a solvent consisting of chain or cyclic ketone, the first metal fine particles being characterized by being spherical metal fine particles (submicron particles) each having a particle diameter of several nanometers to several hundred nanometers.

Also, second metal fine particles in accordance with the present invention are metal fine particles obtained by irradiating laser beams to metal fine particles (submicron particles) each having a particle diameter of several tens nanometers to several hundred nanometers in a dispersion liquid such as water, an alcohol-based solvent, a hydrophobic solvent, or a solvent consisting of chain or cyclic ketone, the second metal fine particles being characterized by being spherical metal fine particles (nano particles) each having a particle diameter of several nanometers to several tens nanometers.

Third metal fine particles in accordance with the present invention are metal fine particles stored in a dispersion liquid containing acetone or other ketones, the third metal fine particles being characterized by being spherical metal fine particles each having a particle diameter not smaller than 1 nm and smaller than 1 μm. By using acetone or other ketones as the dispersion liquid as described above, metal fine particles having a high concentration can be manufactured and stored efficiently. In this case, the dispersion liquid need not contain a protecting agent consisting of a surface active agent or other substances.

Any of the first to third metal fine particles has a characteristic in that the particle has a spherical shape close to a complete sphere, and the particle sizes are highly uniform.

Also, a dispersion liquid for metal fine particles in accordance with the present invention is a dispersion liquid used for manufacturing and storing spherical metal fine particles each having a particle diameter not smaller than 1 nm and smaller than 1 μm, the dispersion liquid being characterized in that the major constituent of the dispersion liquid is acetone or other ketones and the dispersion liquid does not contain a surface active agent or other protecting agents. The present invention has found a novel application of acetone and other ketones. If the metal fine particles are stored by using acetone or other ketones as a dispersion liquid, metal fine particles having a very high concentration can be stored for a long period of time without being aggregated.

According to the manufacturing method for metal fine particles in accordance with the present invention, metal fine particles (nano particles and submicron particles) each having a uniform size can be manufactured very efficiently in large amounts without condensing laser beams as in the case of laser ablation in solution. Also, the metal fine particles obtained by the above-described manufacturing method and the dispersion liquid therefor are expected to be used in various technical fields.

DESCRIPTION OF SYMBOLS

| 10 | dispersion liquid |
| --- | --- |
| 12 | metallic foil piece |
| 14 | submicron particle |
| 16 | nano particle |
| 17 | low-temperature shell |
| 18 | core in a state of high temperature and high pressure |

BEST MODE FOR CARRYING OUT THE INVENTION (Principle of Solution to Problems)
—Phenomenon of Yielding Metal Fine Particles—

Figure 1:
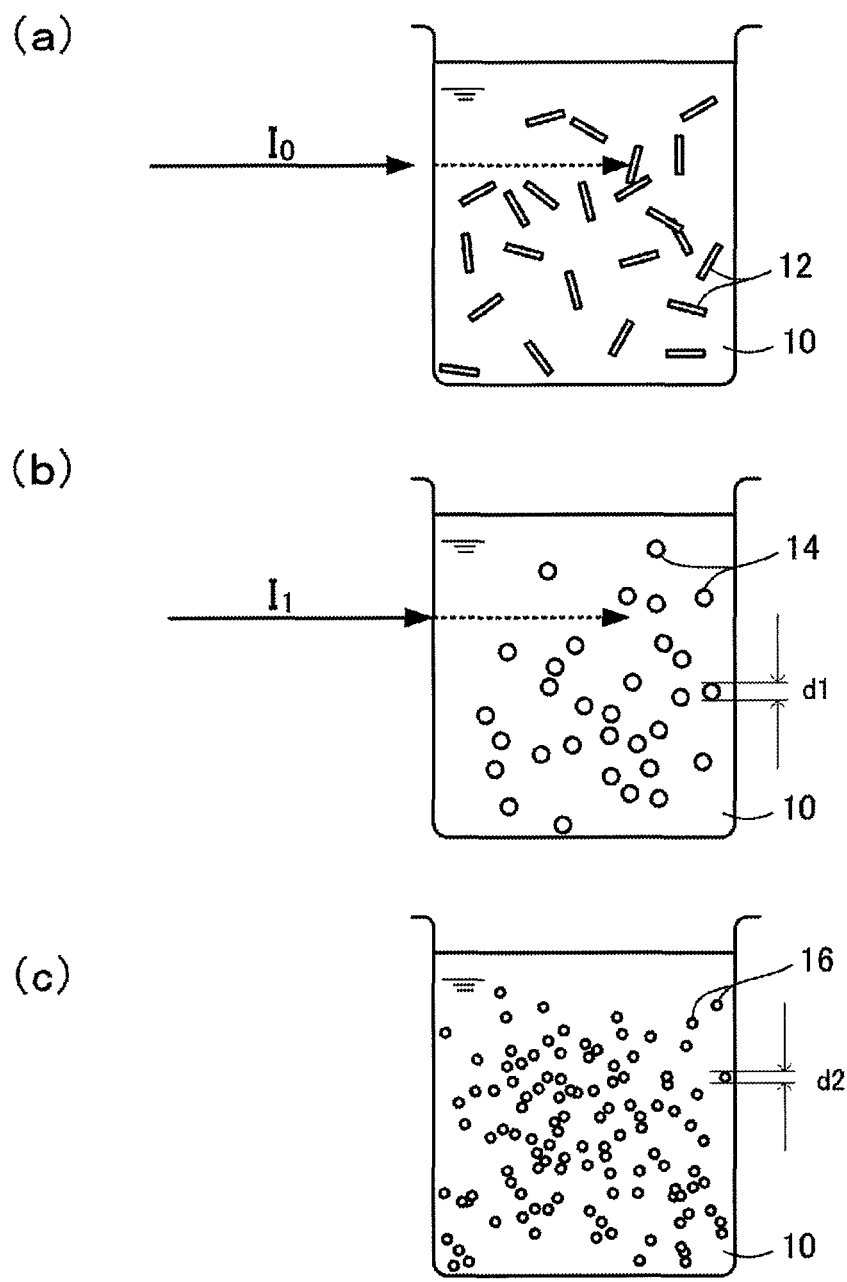
FIG. 1 is schematic views for explaining a phenomenon taking place when a manufacturing method for nano particles in accordance with the present invention is applied, FIG. 1(*a*) showing a state in which metallic foil pieces 12 are dispersed homogeneously in a dispersion liquid 10 in a beaker filled with the dispersion liquid, FIG. 1(*b*) showing a state in which a large number of submicron particles 14 are yielded, and FIG. 1(*c*) showing a state in which a large number of nano particles 16 each having a particle diameter of about several tens nanometers are yielded by further increasing the incident intensity.

FIG. 1 is schematic views for explaining a phenomenon taking place in a manufacturing method for metal fine particles in accordance with the present invention. FIG. 1(a) shows a state in which metallic foil pieces (flake-form metal pieces each having an average particle diameter of about several micrometers to several tens micrometers) 12 are dispersed homogeneously in a dispersion liquid 10 in a beaker filled with the dispersion liquid. Herein, when laser beams having an incident intensity $I_0[J/cm^2]$ was irradiated, a large number of submicron particles 14 were yielded as shown in FIG. 1(b).

Figure 2:
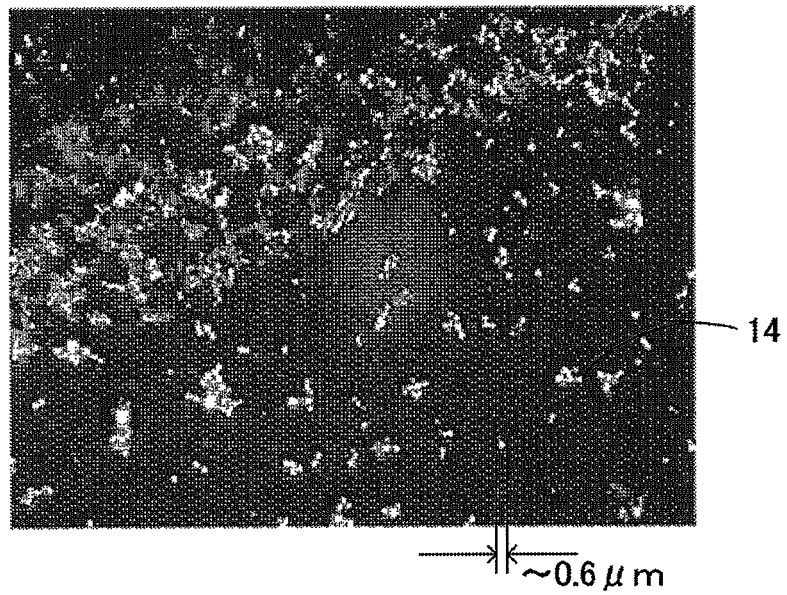
FIG. 2(a) is a photograph of submicron particles 14 observed under an optical microscope after a dispersion liquid has been dried and removed from the state shown in FIG. 1(b)
FIG. 2(b) is a graph showing a measurement result of particle size distribution of several hundreds of submicron particles 14 selected at random.
Figure 2:
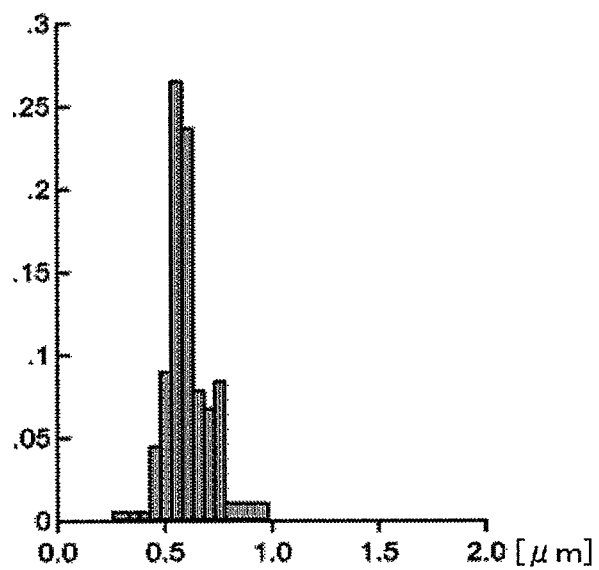

FIG. 2(a) is a photograph of submicron particles 14 observed under an optical microscope after the dispersion liquid has been dried and removed from the state shown in FIG. 1(b). It was observed that any of the submicron particles 14 obtained has a spherical shape very close to a complete sphere, and the sizes thereof were uniform. Some large masses are found because the submicron particles aggregate at the time of drying.

FIG. 2(b) shows a measurement result of particle size distribution of several hundreds of submicron particles 14 selected at random. It was clarified that the average particle diameter of the submicron particles 14 is about 0.6 μm, the distribution width thereof is about ±0.2 μm, and the uniformity of particle size is very high.

When the incident intensity was further increased to $I_1[J/cm^2]$ ($I_0 < I_1$) from the state shown in FIG. 1(b), a large number of nano particles 16 each having a particle diameter of about several tens nanometers were yielded as shown in FIG. 1(c).

In the state shown in FIG. 1(b), namely, in the state in which the submicron particles 14 are present, the dispersion liquid 10 appears cloudy, whereas in the state shown in FIG. 1(c), namely, in the state in which the nano particles 16 are present, the dispersion liquid 10 is in a colloid form, and a color unique to the metal appears. For example, gold colloid assumed a red color, silver colloid assumed a yellow color, and copper colloid assumed a greenish brown color.

As another experiment, when laser beams having an intensity not lower than a certain value (in the above-described example, incident intensity $I_1[J/cm^2]$) was irradiated from the state shown in FIG. 1(a) without going through the state shown in FIG. 1(b), a large number of nano particles 16 were yielded without going through the submicron particles 14. Further, various phenomena were observed that the sizes and particle size distribution of the fine particles yielded changed according to the conditions of the irradiated laser beams and the thickness etc. of metallic foil piece, and nano particles aggregated again to turn to clusters.

Thus, the inventors found, for the first time, a knowledge that by using metallic foil pieces as a starting substance, metal fine particles can be yielded without condensing beams using a lens as in the case of laser ablation in solution.

Also, by subsequent studies, it was clarified qualitatively that the metallic foil pieces of starting substance having a larger surface roughness to some degree achieve a higher yielding efficiency of metal fine particles. The surface roughness also correlates significantly with the specific surface area of metallic foil pieces. For example, in an experiment in which laser beams of 1064 nm was irradiated using four kinds of samples having different specific surface areas (BET surface areas) (A: 0.88, B: 1.60, C, 1.93, D: 3.54, units: [m²/g]), a result was obtained that the surface area increases in the order of A, B, C and D, and a sample having a larger specific surface area has a higher yielding efficiency of fine particles. The degree of optimal roughness will be clarified by the future experiment.

—Mechanism for Yielding Metal Fine Particles—

Based on the above-described results, the mechanism for yielding metal fine particles is explained.

FIGS. 3(a) to 3(d) and FIGS. 4(e) to 4(h) are schematic views for explaining the mechanism for yielding metal fine particles in accordance with the present invention.

Figure 3:
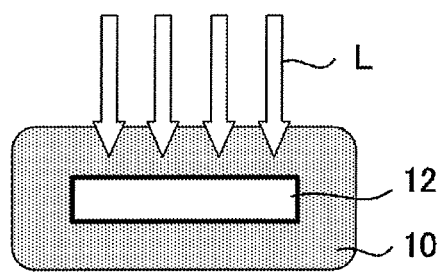
FIGS. 3(a) to 3(d) are schematic views for explaining a mechanism for yielding metal fine particles in accordance with the present invention.
Figure 3:
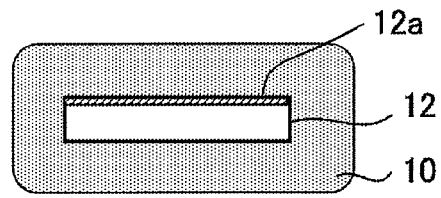
Figure 3:
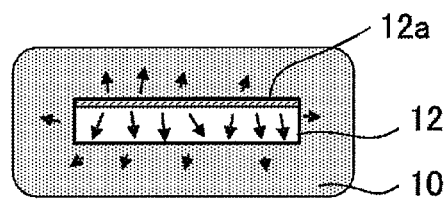
Figure 3:
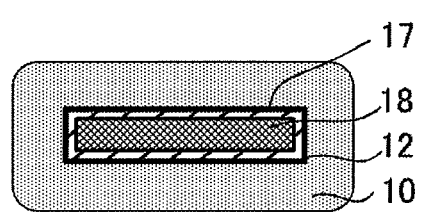

FIG. 3(a) shows that the metallic foil piece 12 shown in FIG. 1 is present in the dispersion liquid 10, and shows a state in which laser beams L (for example, wavelength: 532 nm, pulse width: 5 ns) are irradiated to the metallic foil piece 12.

FIG. 3(b) shows the state immediately after the laser beams have been irradiated. The beams are absorbed by a top surface layer portion 12a of the metallic foil piece 12, and in this portion, the temperature rises locally, and momentarily reaches a value close to the melting point. However, since the metallic foil piece 12 has a high heat conductivity, thermal diffusion occurs in the whole of the metallic foil piece in a very short period of time. As a result, the whole of the metallic foil piece becomes in a high-temperature state in which the temperature is uniform. FIG. 3(c) shows a state in which the temperature rising in the top surface layer portion produces rapid thermal diffusion.

On the other hand, since a large quantity of dispersion liquid 10 is present around the metallic foil piece 12 heated to a high temperature, the heat is absorbed by the medium surrounding the metallic foil piece. As a result, the temperature of the top surface layer portion lowers, so that a core 18 in a state of high temperature and high pressure becomes in a state of being confined by a low-temperature shell 17 (core-shell construction) as shown in FIG. 3(d).

In FIG. 3(d), a double construction of [core 18/shell 17] is shown. More exactly, however, in the case where the high-temperature core-shell construction is present in the solvent as described above, high-temperature vapor is formed around the metallic foil piece, so that a triple construction of [core/outer shell portion cooled by the solvent/high-temperature vapor layer] is formed.

Figure 4:
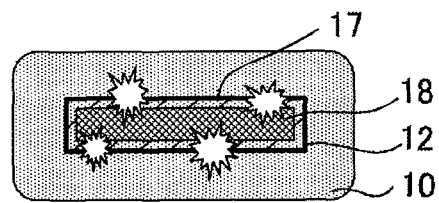
FIGS. 4(e) to 4(h) are schematic views for explaining a mechanism for yielding metal fine particles in accordance with the present invention.
Figure 4:
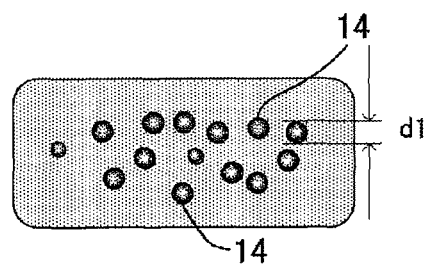
Figure 4:
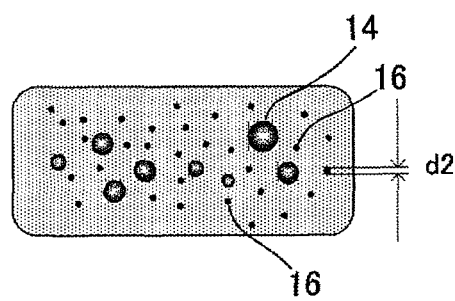
Figure 4:
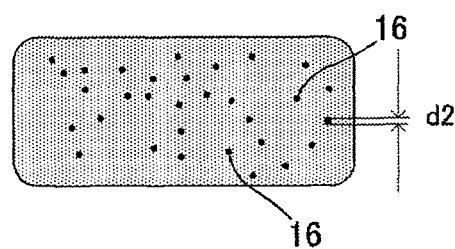

Anyway, such a core-shell construction is very unstable physically. Therefore, as shown in FIG. 4(e), explosive splitting occurs from the interior of metallic foil piece to relax thermal stress. As a result, as shown in FIG. 4(f), one metallic foil piece splits into many submicron particles 14 (on the order of about several hundred nanometer, the typical value of a particle diameter d1 of fine particle is, for example, about 500 nm to 600 nm). This state is shown in FIG. 1(b).

When high-energy laser beams are further irradiated, as shown in FIG. 4(g), the submicron particle 14 further splits and decreases in size. Finally, one submicron particle 14 splits into many nano particles 16 (on the order of about several tens nanometers, the typical value of a particle diameter d2 of nano particle is, for example, about 20 nm).

Depending on the condition of dispersion liquid etc., if the irradiation amount and time of laser beams become excessive, in some cases, nano particles aggregate after going through the state shown in FIG. 4(h), and a state in which the submicron particles 14 and the nano particles 16 are mixed with each other is formed. However, it is thought that, in some applications, a system containing both of the submicron particles and the nano particles as described above is desirable.

In conclusion, the mechanism for yielding metal fine particles in accordance with the present invention is thought to be due to explosive splitting of the core-shell construction, and apparently differs from the conventionally known laser ablation in solution. If laser beams of 532 nm are irradiated with a relatively high fluence for hours using a sample manufactured by mixing gold and silver metallic foil pieces as a starting substance, alloying sometimes occurs through secondary ablation (evaporation) of nano particles yielded initially. However, considering the fact that under other irradiation conditions, nano particles of gold and sliver alloys are not yielded at all, and the fact that the metal nano particles obtained by the method in accordance with the present invention are formed so as to have a shape very close to a complete sphere and a narrow particle diameter distribution, it is thought that the nano particles in accordance with the present invention are not yielded mainly by the evaporation and recombination of atom-form particles unlike the laser ablation in solution.

—Theoretical Consideration Based on Numerical Calculation—

The inventors made theoretical consideration based on numerical calculation taking the case of copper foil pieces as an example. First, the shape of a copper foil piece, which is a starting substance, was specified so as to have a cross-sectional area S [$\mu m^2$] and a thickness d [$\mu m$], and energy necessary for the whole of copper foil piece to reach the melting point (melting energy) E1 [J] and energy necessary for the whole of copper foil piece to reach the boiling point (boiling point attaining energy) E2 [J] were determined by calculation.

The physical constants necessary for the calculation are as follows:

Atomic weight of copper M=63.54, density d=8.92 g/cm$^3$, melting point=1083° C., boiling point=2582° C., specific heat (solid)=0.393 J/g, heat of melting=205 J/g, specific heat (liquid)=0.487 J/(g·K), heat of evaporation=480 J/(g·K)

Figure 5:
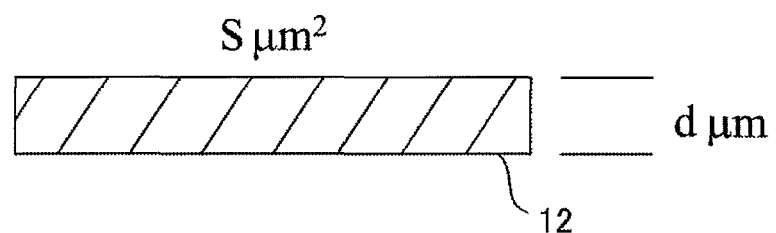
FIG. 5(a) is a sectional view showing a shape of a copper foil piece 12 that is set to make theoretical consideration based on numerical calculation.
FIG. 5(b) is a schematic view showing the intensity of incident beam, reflected beam, and transmitted beam of laser beams at the time when the laser beams go into the metallic foil piece shown in FIG. 5(a)
Figure 5:
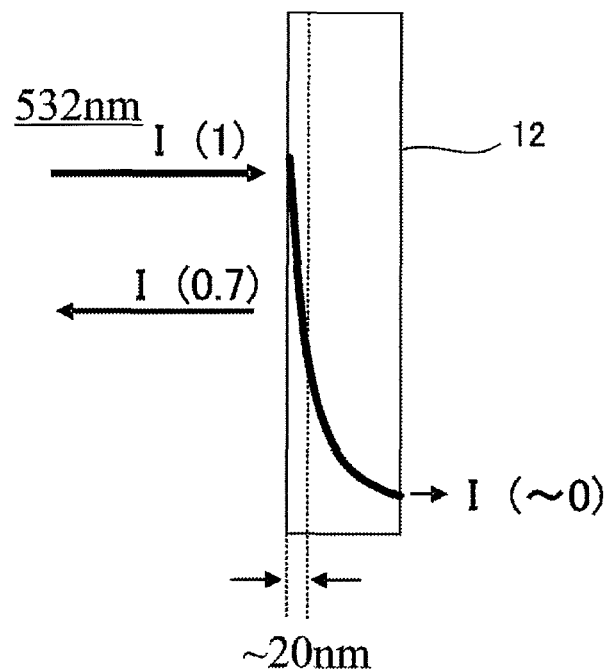

The mass of the copper foil piece having a surface area S [$\mu m^2$] and a thickness d [$\mu m$] as shown in FIG. 5(a) is 8.92×10$^{-12}$×S×d [g]. Therefore, (i) the melting energy E1 and (ii) the boiling point attaining energy E2 are calculated by using the following equations. The calculations were made by using room temperature (20° C.) as the initial temperature.

(i) Melting energy E1 [J]

$$E1=\{(0.393\times(1083-20)+205\}\times 8.92\times 10^{-12}\times S\times d$$

(ii) Boiling point attaining energy E2 [J]

$$E2=E1+\{(0.487\times(2582-1083)\}\times 8.92\times 10^{-12}\times S\times d$$

Therefore, the calculations are made by $$E1=5.56\times 10^{-9}\times S\times d[J] \quad (i)$$

$$E2=1.2\times 10^{-9}\times S\times d[J] \quad (ii)$$

In the case where laser beams are pulse irradiated to the metallic foil piece, most of the incident energy is reflected, and the remaining is absorbed. In this case, the incident energy attenuates as an exponential function. Almost all the energy is absorbed by the top surface layer portion (about 20 nm or thinner) of the incident surface, and in the case where the thickness of metallic foil piece is not smaller than 20 nm, the transmitted beam substantially becomes zero. This is the reason why the temperature rises locally only in the top surface layer portion when laser beams are irradiated.

FIG. 5(b) is a schematic view showing the intensity of incident beam, reflected beam, and transmitted beam of laser beams at the time when the laser beams go into a metallic foil piece shown in FIG. 5(a).

In the case where the magnitude of incident energy is made 1 to simplify the numerical calculation, since the magnitude of energy of transmitted beam is substantially zero, it is assumed that the magnitude of energy absorbed by the metallic foil piece is approximately 0.3, and the remaining 0.7 is reflected (although this assumption changes according to the conditions such as the thickness of the metallic foil piece with respect to the wavelength of laser beams or the absorption coefficient of beam, this approximate value is thought to be a substantially rational value for experimental conditions).

In the case where laser beams are irradiated to a copper foil piece, the condition for melting the copper foil piece is as described below (the initial temperature is made room temperature). When the incident energy density per one pulse of laser beams is denoted by F [J/cm$^2$], taking the absorption coefficient as 0.3, energy A absorbed by a copper foil piece having a cross-sectional area S [μm²] is expressed by $$A = 0.3 \times F \times S \times 10^{-8} \quad [J]$$

Therefore, the melting condition (the initial temperature is room temperature 20° C.) of the whole of copper foil piece is given by $$A > E1$$

Rewriting of this equation yields $$0.3 \times F \times S \times 10^{-8} > 5.56 \times 10^{-9} \times S \times d$$

Rearranging this equation gives $$F > 1.85 \times d \quad \text{(Eq. 1)}$$

Similarly, since an equation A>E2 holds for the boiling point attaining energy E2 as well, substituting the equations into both sides and rearranging the resultant equation give $$F > 4 \times d \quad \text{(Eq. 2)}$$

In Equations 1 and 2, d denotes the thickness of copper foil piece, and if a numerical value determined by the calculation from the value of surface area determined by the BET method (the general method for determining surface area utilizing nitrogen adsorption) is substituted into d, interesting results can be obtained.

| Melting Condition | |
|---|---|
| d [μm] | F [mJ/cm²] |
| 0.4 | 740 |
| 0.2 | 370 |
| 0.1 | 185 |
| 0.05 | 93 |

| Boiling Point Attaining Condition | |
|---|---|
| d [μm] | F [mJ/cm²] |
| 0.4 | 1600 |
| 0.2 | 800 |
| 0.1 | 400 |
| 0.05 | 200 |

From these results, it is thought that if laser beams exceeding some threshold energy density $E_{th1}$ (defined as "the first threshold energy") are irradiated to a metallic foil piece, submicron particles are yielded, and if laser beams exceeding an energy density $E_{th2}$ higher than $E_{th1}$ (defined as "the second threshold energy") are irradiated to a metallic foil piece, nano particles are yielded.

Although numerical calculation was made to obtain the "boiling point attaining condition", since much dispersion liquid is present around the metallic foil piece, the metallic foil piece never evaporates actually as atoms. This point is important. Needless to say, it is thought that if the energy is further raised, evaporation similar to the laser ablation in solution occurs without going through the process described in the explanation of the aforementioned mechanism, such as an explosion of core-shell construction.

The tables shown below compare the calculated values of the first and second threshold energies with the experimental approximate values. This result is thought to show the rationality of the above-described theoretical consideration.

| Comparison Table | | |
|---|---|---|
| d [μm] | F [mJ/cm²] (Calculated value) | F [mJ/cm²] (Experiment approximate value) |
| (a) | | |
| 0.062 | 115 | 200 |
| 0.185 | 340 | 300 |
| 0.317 | 586 | 500 |
| (b) | | |
| 0.062 | 248 | 500 |
| 0.185 | 740 | 500 |
| 0.317 | 1270 | 1000 |

The above-described theoretical consideration is based on the optical constant of a bulk metal. According to this theory, at a wavelength that greatly decreases the beam absorption coefficient, it is not likely that fine particles are yielded. However, according to the subsequent experiment, it was found that, even at a basic wavelength 1064 nm of Nd:YAG laser, fine particles are yielded with efficiency equivalent to or higher than that in the case of wavelength 532 nm. Therefore, it is thought that the above-described theory must be somewhat corrected.

That is to say, in the above-described numerical calculation, a simple model such that the metallic foil piece has a flat plate shape was assumed, and moreover, an optical constant of a bulk was used as the optical constant. Actually, however, it is thought that due to the influences of the shape of the end portion of foil piece and the surface roughness, the interaction with surface plasmon beam gives a relatively high absorption coefficient even at a long wavelength.

In the case where laser beams of 1064 nm were irradiated to a bulk-form silver plate in a dispersion liquid, even if the laser beams were irradiated to the mirror surface (when the surface roughness is very small), most of the incident beam is reflected, and fine particles were not yielded. Whereas, it was confirmed that when similar laser beams are irradiated to a silver plate having a large surface roughness, which was used as a sputtering target, fine particles were yielded heavily. This is thought to suggest that the mechanism in accordance with the present invention requires a complicated theoretical explanation, more particularly, considering "surface plasmon resonance" and the like.

As described above, a metallic foil piece has a higher beam absorption efficiency than a bulk metal, and has a high efficiency of thermal diffusion to the interior of metal, so that it is thought that the core-shell construction is formed efficiently even by beams having a relatively long wavelength, and it is thought that this is the mechanism for yielding metal fine particles in accordance with the present invention. Considering in such a manner, this mechanism matches with the experimental result, obtained by the inventors, that in the case where the roughness of metallic foil piece, which is a starting substance, is large to some degree, fine particles are yielded even in a long wavelength region in which beams should inherently not be absorbed sufficiently.

—Difference in Mechanism Compared with Organic Compound Crushing Method—

As a method for manufacturing fine particles of a solid organic compound, a method has been known in which a solid organic compound is dispersed in a solvent at the normal temperature, and pulse laser beams are irradiated to the solid organic compound (Patent Document 2 etc.). However, the mechanism is such that, by irradiating laser beams to the organic compound, a local temperature difference is produced between the irradiated location of organic compound and the solvent, by which cracks are developed in the interior thereof to crush the organic compound from the interior thereof.

An organic compound is generally vulnerable to heat, and is thought to be likely to decompose at high temperatures. Therefore, the use of laser beams so intensely enough to make an organic compound become in a melted state is not permitted because such laser beams give thermal damage to the organic compound. On the other hand, since a solid organic compound has a low heat conductivity, even if the temperature rises locally at the laser beam irradiated location, heat does not conduct to the surroundings if the laser beams are irradiated for a short period of time. Therefore, thermal damage does not occur, and at the same time, cracks are developed from the irradiated location by the temperature difference between the irradiated location and the solvent to crush the organic compound.

Resultantly, in the organic compound crushing method, low heat conductivity plays an important role in yielding fine particles. Also, in the case where fine particles are yielded by crushing, it is thought that spherical fine particles are not obtained.

Also, in the method in which the organic compound is crushed by cracks, it is thought that crushing is advanced stepwise by the interaction due to repeated irradiation of laser beams, and therefore it is desirable to repeatedly irradiate pulse laser for a short period of time. Whereas, in the case where metallic foil pieces are made fine particles in accordance with the present invention, if laser beams having such energy as to make the metallic foil piece in a melted state are irradiated once to individual metallic foil pieces, explosive splitting occurs immediately due to the above-described mechanism, so that laser beams need not be irradiated repeatedly to one foil piece. The reason why pulse irradiation was used in the experiment is that since a large number of metallic foil pieces are present in the dispersion liquid, a chance for laser beams to be irradiated uniformly is given.

As described above, the method in which the organic compound dispersed in a dispersion liquid is made fine particles by laser beams and the method of the present invention in which the metallic foil pieces dispersed in a dispersion liquid are made fine particles by laser beams have entirely different mechanisms for solving the problems.

(First Embodiment)

Next, a manufacturing method for metal fine particles in accordance with the present invention is explained. First, a general explanation is given of a starting substance, laser beams, and a dispersion liquid, which are important conditions for carrying out the present invention.

A. Starting Substance

As a starting substance, metallic foil pieces, specifically, gold, silver, copper, nickel, a copper-zinc alloy (brass), and other metallic foil pieces can be used. In the present invention, the thickness of starting substance is very important. Even in the case where laser beams having the same energy density are irradiated, as the thickness decreases, metal fine particles each having a smaller particle diameter are formed efficiently. According to the experiment conducted by the inventors, in the case where any metal was used, the metallic foil pieces having an average thickness exceeding 1 μm do not at all turn to fine particles. (however, it seems that they turn to fine particles if the intensity of laser beams is increased).

The manufacturing method for metallic foil pieces is not subject to any special restriction. As one example, a method is conceivable in which atomize powder is pulverized into a flake form, or a metallic thin film is formed on a thin natural mica by the sputtering method, and the metallic thin film is pulverized together with the mica by ultrasonic treatment.

If an alloy such as a copper-zinc alloy (brass) or a copper-silver alloy, not limited to a pure metal such as gold, silver, copper, nickel, or zinc, is formed into a foil piece shape, fine particles can be yielded similarly.

Also, though the details of the mechanism etc. are not apparent, for a starting substance obtained by depositing a silicon film (Si) having a thickness of about 0.2 μm into a polyimide thin film having a thickness of 25 μm by using the sputtering method and cutting it into a thin rectangular shape having a width of about 1 mm to 2 mm and a length of about several millimeters (such a shape was formed to liken it to a foil piece), submicron particles were obtained in the same way as a metal. Silicon has a lower heat conductivity than a metal, and on the other hand, has a far higher laser beam absorption coefficient than a metal. In this respect, silicon has physical properties apparently different from those of a metal. Nevertheless, silicon fine particles were yielded by the same method as that for a metal. It will be necessary to further verify the mechanism for making a nonmetal such as silicon fine particles and the applications etc. thereof.

B. Laser Beams

The second important condition is laser beams. The wavelength of laser beams is preferably a wavelength such that the absorption coefficient of metal increases to some degree. If the energy density has a value higher than a certain value, even if the absorption rate is 30% (the reflection rate is 70%), since the starting substance is foil pieces, explosion due to core-shell construction occurs even at a low energy density. The specific numerical value will be described later as an example.

For example, as laser beams, YAG laser, excimer laser, semiconductor laser, dye laser, or the like can be used. Also, since fine particles are yielded by one shot of short-term laser irradiation for one foil piece, in order for laser beams to be irradiated to many foil pieces under the same conditions, pulse irradiation is preferable as described above.

Herein, to obtain a knowledge of time scale for metallic foil pieces heated to a high temperature momentarily in a dispersion liquid to be splitted and made fine particles, the inventors conducted a comparison experiment for two cases for one-second pulse interval and one millisecond pulse interval by using "femtosecond laser".

In the case where the pulse interval was one second, fine particles were not yielded. This is a right and proper result because metallic foil pieces are not melted by energy of one-shot femtosecond pulse. On the other hand, in the case where the pulse interval was one millisecond, it was confirmed that metallic foil pieces were split heavily and made fine particles. The reason for this is thought to be that energies of a plurality of pulses were added, and therefore the melting of metallic foil pieces proceeded. Also, the time scale for yielding fine particles was far longer than expected at first, and the possibility of millisecond or longer was also suggested. These results suggest that the light source is not limited to pulse laser beams, and other strong pulse light sources having a time interval of, for example, about millisecond (light source other than laser beams) can be used alternatively.

For the above-described reason, for the "laser beams" used in the present invention, it is important that the energy density per unit area be within a certain range, and it is thought that the properties unique to laser beams, such as monochromaticity and coherency, are not needed. In this meaning, in this description, "laser beams" are interpreted in a broader sense than usual, and include strong (high-energy) pulse beams.

C. Dispersion Liquid (Dispersion Solvent)

The dispersion liquid is a solvent for dispersing metallic foil pieces, which are a starting substance (since the state of metallic foil pieces must be kept, a solvent that melts the metallic foil pieces is regarded as wrong). The dispersion liquid is preferably a substance having a low heat conductivity. Also, it is important that the dispersion liquid have a high dispersibility (namely, foil pieces are uniformly present in the liquid). Therefore, as an applicable dispersion liquid, the following are cited.

(1) Water

Water has an advantage of low heat conductivity and high efficiency of yielding fine particles. However, since the dispersibility of starting substance is low, metallic foil pieces are liable to precipitate and separate. Therefore, a contrivance is needed such that metallic foil pieces are dispersed homogeneously in the dispersion liquid by using an auxiliary means such as an agitator.

(2) Alcohol-Based Solvent

Alcohols (for example, ethyl alcohol) or a mixed solution of alcohol and water can be used. The efficiency of yielding fine particles is a little lower than that of water. Also, in the case of ethyl alcohol, the obtained fine particles (especially nano particles) are sometimes aggregated.

(3) Hydrophobic Solvent

A solvent, such as hexane, containing, for example, a small amount of long chain alkylamine can be used. In the experiment conducted by the inventors, both of the dispersibility and the efficiency of yielding fine particles were high.

(4) Other solvents

During the time when the concentration of fine particles dispersed is low, the dispersibility is kept for a relatively long period of time even if any solvent of the items (1) to (3) is used. However, if the concentration is increased to raise the yield, unless a protecting agent is added, aggregation and sedimentation start within 24 hours. Also, the metallic foil pieces aggregated or sedimented once sediment again immediately even if being dispersed forcedly. It has been clarified that, in such a case, if the solvent described below is used, the dispersibility is kept for a long period of time.

a. [Ketones]

a1. Chain Ketones Such as Acetone or Diethylketone
a2. Cyclic Ketones Such as Cyclohexanone b. [Tetrahydrofuran (THF)]

c. [Acetonitrile, Dimethyl Sulfoxide (DMSO)]

Any of these solvents is a solvent having a high Lewis basicity, and has an electron-donating property to a metal. Therefore, it is thought that the particles are protected by coordinating solvent molecules themselves on the surfaces of metal fine particles, and the dispersibility is improved.

In particular, the effects of the chain or cyclic ketones of above a1 and a2 are great. For example, even in a high-concentration dispersion liquid in which nano particles not less than 50 mg were dispersed in 10 cc of acetone, aggregation and sedimentation were not at all found for a long period of several months. Also, in the case of relatively large submicron particles, it was found that, although sedimentation due to gravity occurs, aggregation does not occur. Therefore, ketones having a high specific gravity were used, by which the sedimentation due to gravity could be restrained.

As described above, ketones (cyclic and chain), THF, acetonitrile, and DMSO are useful as a solvent capable of manufacturing a high-concentration dispersion liquid. Among these, acetone was generally excellent because metal particles could easily be taken out of the dispersion liquid because of high volatility thereof, it had high dispersion keeping property (less liable to aggregate and sediment), and it was easy to handle. In the experiment, the inventors made comparison by using gold, silver, copper, nickel, zinc, cobalt, germanium, an alloy of germanium with another metal (germanium alloy), a copper-zinc alloy (brass), and a copper-silver alloy. The comparison revealed that the dependency according to the kind of metal was not found, and the dispersibility depended on the solvent only.

<Regarding Specificity of Acetone Etc.>

The inventors studied the reason why acetone and the dispersion liquid for metal fine particles, which contains other ketones (including diketones), are excellent in dispersion keeping property as compared with other dispersion liquids. As one possibility, it can be thought that acetone decomposes thermally when metallic foil pieces are split explosively by the irradiation of laser beams, and some kind of product restrains the aggregation of metal fine particles. To clarify the genuineness of this possibility, the experiment described below was conducted.

Experiment (Step 1): Gold (Au) nano particles were yielded by using ethyl alcohol as a dispersion liquid, and these particles were made [Sample I]

(Step 2): The particles obtained by adding acetone to Sample I were made [Sample II]. The mixing ratio of ethyl alcohol to acetone was 2:3 by volume.

(Step 3): The time changes of absorption spectra of Sample I and Sample II were measured.

As described above, it is known that ethyl alcohol aggregates nano particles. It was visually observed that gold nano particles already began to aggregate at the time when [Sample I] was prepared. On the other hand, in [Sample II] obtained by adding acetone, aggregation was not found, and re-dispersion (the reverse to aggregation) rather occurred.

Figure 10:
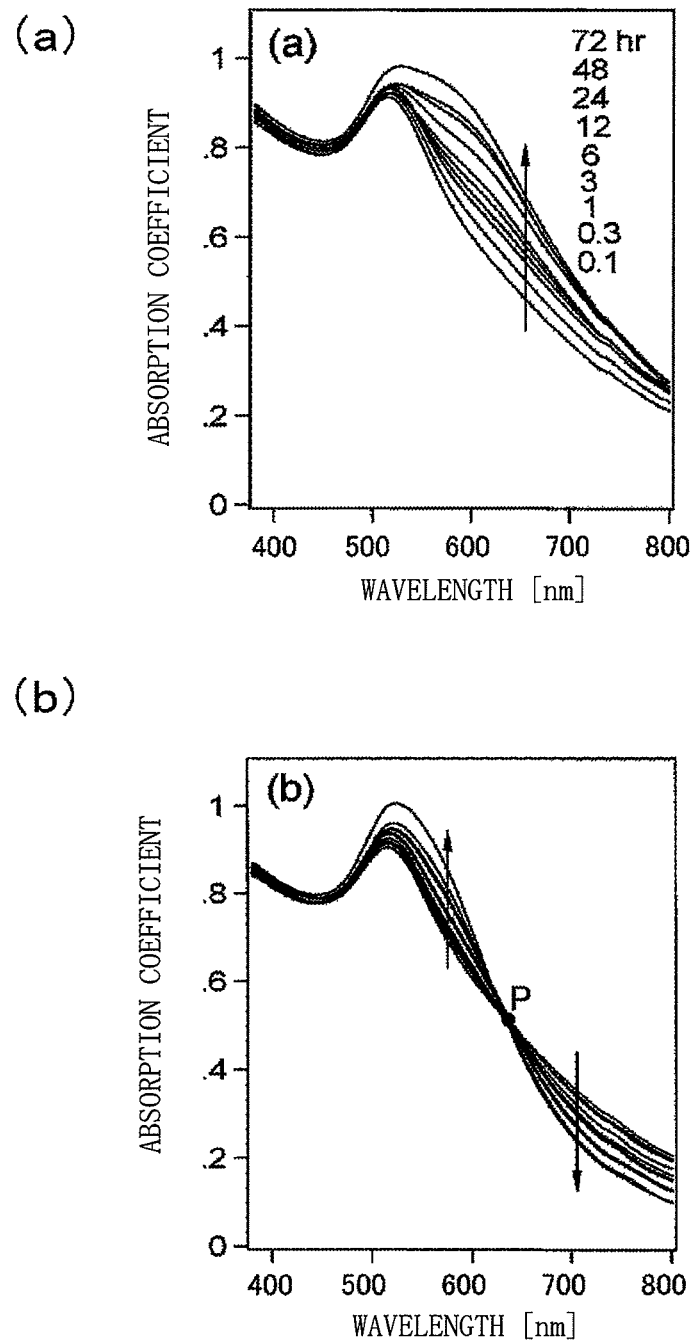
FIGS. 10(a) and 10(b) are graphs showing results of comparison of time changes in absorption spectra measured in Step 3.

FIGS. 10($a$) and 10($b$) are graphs showing results of comparison of time changes in absorption spectra measured in Step 3. In the case of [Sample I], aggregation proceeded with the elapse of time, whereas, in the case of [Sample II], inversely, re-dispersion proceeded. Point P in FIG. 10($b$) is referred to as an "isosbestic point".

Thus, in the ethanol system, aggregation proceeded unidirectionally. Whereas, in the system in which acetone was mixed, the absorption spectrum changed while being accompanied by the isosbestic point, and the particle diameters rather decreased. Since acetone is added after sufficient time has elapsed from the irradiation of laser beams, it is thought that the effect of adding acetone is not achieved by the thermally decomposed substance of acetone, but is achieved by acetone molecules themselves. Also, almost the same result was obtained for other cyclic and chain ketones.

EXAMPLES

Figure 6:
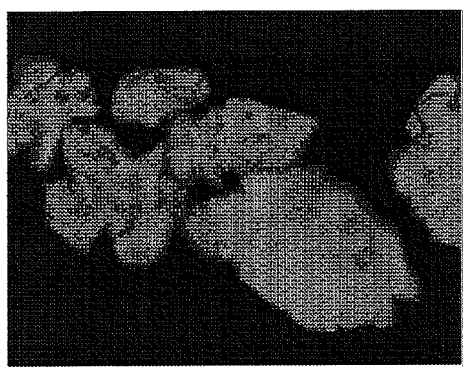
FIGS. 6(a) to 6(d) are enlarged photographs under an optical microscope of particles obtained as the result of dispersion of copper foil pieces in a dispersion liquid and pulse irradiation of laser beams having different energy densities.
Figure 6:
Figure 6:
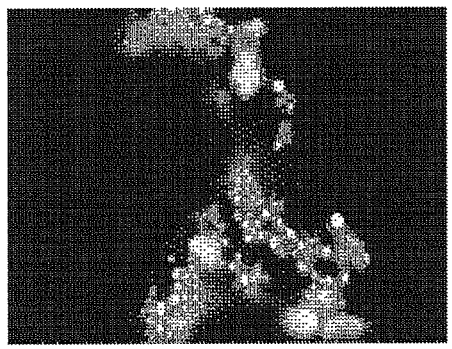
Figure 6:
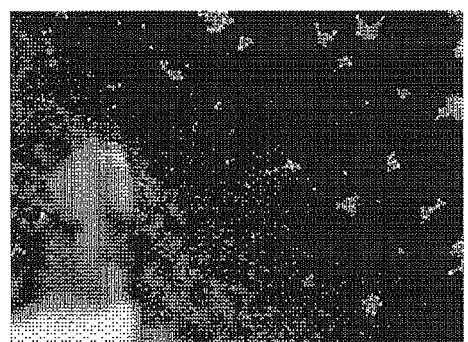
Figure 7:
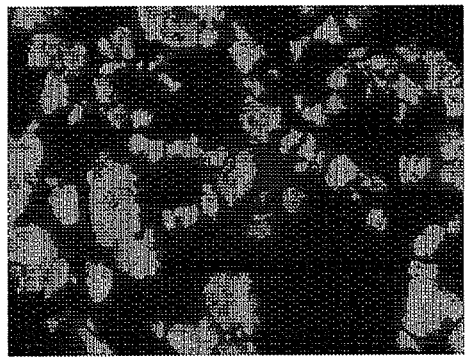
FIGS. 7(a) to 7(d) are enlarged photographs under an optical microscope of particles obtained as the result of dispersion of copper foil pieces in a dispersion liquid and pulse irradiation of laser beams having different energy densities.
Figure 7:
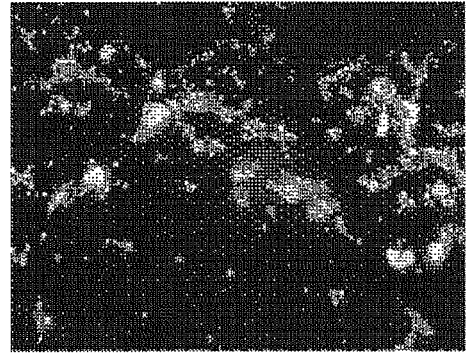
Figure 7:
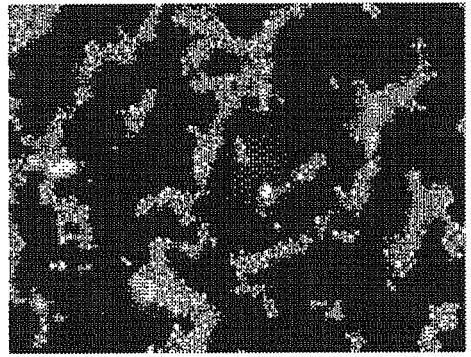
Figure 7:
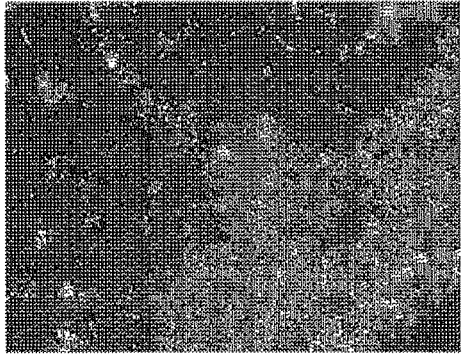
Figure 8:
FIGS. 8(a) to 8(e) are enlarged photographs under an optical microscope of particles obtained as the result of dispersion of copper foil pieces in a dispersion liquid and pulse irradiation of laser beams having different energy densities.
Figure 8:
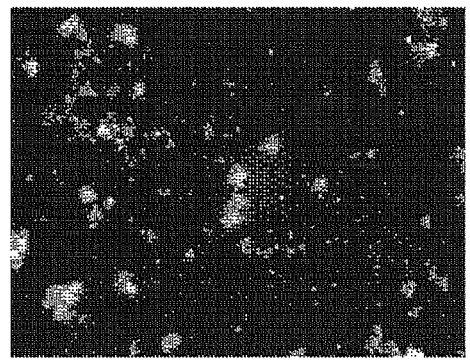
Figure 8:
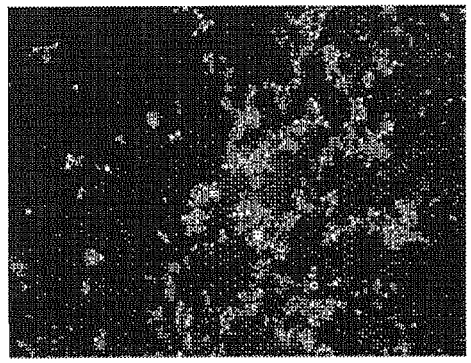
Figure 8:
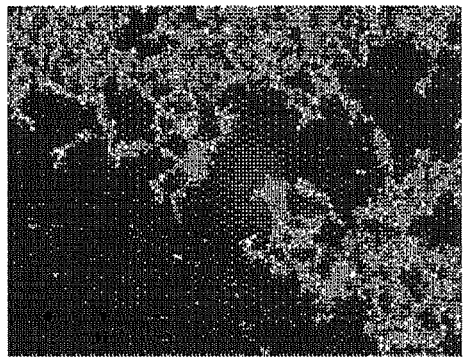
Figure 8:
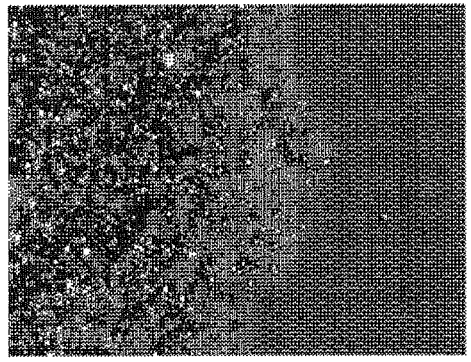

FIGS. 6 to 8 are enlarged photographs under an optical microscope of particles obtained as the result of dispersion of three kinds of copper foil pieces having different average particle diameters and thicknesses in a dispersion liquid and pulse irradiation of laser beams having different energy densities. These photographs were taken after the dispersion liquid had been dried. Also, the thickness of copper foil piece was a value determined by calculation from the surface area determined by the BET method.

As the laser beams, YAG laser of a wavelength of 532 nm and a pulse width of 5 ns was used. Also, as the dispersion liquid (dispersion solvent) for dispersing the copper foil pieces, a mixed solvent of alcohol and water was used.

—(Condition 1): Average Particle Diameter 40 μm, Copper Foil Piece Thickness 0.317 μm—

FIG. 6(a) shows the state before laser beams were irradiated. FIG. 6(b) shows the case where laser beams of about 250 mJ/cm$^2$ were pulse irradiated, FIG. 6(c) shows the case where laser beams of about 500 mJ/cm$^2$ were pulse irradiated, and FIG. 6(d) shows the case where laser beams of about 1 J/cm$^2$ were pulse irradiated.

According to the above-described consideration, whether or not fine particles are yielded is determined by the relationship between the incident energy and the thickness of copper foil piece. In the case where the thickness was 0.3 μn, for the incident energy of 250 mJ/cm$^2$, the yielding of submicron particles was limitative, and for the incident energy of 500 mJ/cm$^2$, submicron particles were yielded. In the case where the incident energy was 1 J/cm$^2$, a state in which many nano particles were yielded was observed. In this case, the aggregation of nano particles was also observed, so that it is thought that the state shown in FIG. 4(g) was formed.

—(Condition 2): Average Particle Diameter 13 μm, Copper Foil Piece Thickness 0.185 μm—

FIG. 6(a) shows the state before laser beams were irradiated. FIG. 6(b) shows the case where laser beams of about 250 mJ/cm$^2$ were pulse irradiated, FIG. 6(c) shows the case where laser beams of about 500 mJ/cm$^2$ were pulse irradiated, and FIG. 6(d) shows the case where laser beams of about 1 J/cm$^2$ were pulse irradiated.

In the case where the thickness was 0.185 μm, for the incident energy of 250 mJ/cm$^2$, the yielding of submicron particles was limitative, and for the incident energy of 500 mJ/cm$^2$, submicron particles were yielded. In the case where the incident energy was 1 J/cm$^2$, a state in which many nano particles were yielded was observed. In this case, the aggregation of nano particles was scarcely present, so that it is thought that the state shown in FIG. 4(h) was formed.

—(Condition 3): average particle diameter 3 μm, thickness 0.062 μm —

FIG. 7(a) shows the state before laser beams were irradiated. FIG. 7(b) shows the case where laser beams of about 150 mJ/cm$^2$ were pulse irradiated, FIG. 7(c) shows the case where laser beams of about 250 mJ/cm$^2$ were pulse irradiated, FIG. 7(d) shows the case where laser beams of about 500 mJ/cm$^2$ were pulse irradiated, and FIG. 7(e) shows the case where laser beams of about 1 J/cm$^2$ were pulse irradiated.

In the case where the thickness was 0.062 μm, for the incident energy of 150 mJ/cm$^2$, the yielding of submicron particles was limitative, and for the incident energy of 250 mJ/cm$^2$ and 500 mJ/cm$^2$, submicron particles were yielded. Further, in the case where the incident energy was 1 J/cm$^2$, a state in which many nano particles were yielded was observed. In this case, the aggregation of nano particles was scarcely present, so that it is thought that the state shown in FIG. 4(h) was formed.

All of the above-described experimental results agree well with the conclusion of the aforementioned theoretical consideration. That is to say, as the thickness d of copper foil piece decreases, fine particles or nano particles are yielded even by lower incident energy, and as the thickness increases, the incident energy of laser beams necessary for yielding fine particles or nano particles increases.

At least regarding silver and gold, it has been verified that the dispersion liquid containing nano particles manufactured by the method in accordance with the present invention does not precipitate for many months without adding a protecting agent (surface active agent) such as SDS, namely, maintains a dispersed state without being aggregated. The reason for this is thought to be that the nano particle obtained has a spherical shape very close to a complete sphere. In contrast, in the case where nano particles are yielded by laser ablation, since various particles such as atoms and clusters collect to form fine particles, the sizes and shapes thereof are nonuniform, so that it is thought that the dispersion liquid may be liable to aggregate.

The metal fine particles obtained by the present invention are expected to be used as a raw stock for various new materials as submicron particles or nano particles by removing the dispersion liquid. Also, they can be applied to conductive ink for drawing fine wiring by an inkjet system using the technique of screen printing if the property that the dispersed state is kept in the solvent is utilized. In the case where the metal fine particles are used for conductive ink, it is thought that submicron particles rather have higher conductivity than nano particles.

Also, instead of irradiating laser beams in the state in which the dispersion liquid is stored in a big vessel such as a beaker, laser beams may be irradiated while the dispersion liquid is dripped or allowed to flow in a capillary.

(Second Embodiment)

In the case where a metallic thin film is used in place of metallic foil pieces as a starting substance to apply the above-described first embodiment, an interesting result can be obtained. The metallic thin film can be thought to be a metallic foil piece having an infinite particle diameter in terms of the continuity in the transverse direction.

In this case, depending on the beam size of irradiated laser beams, the whole of the thin film cannot be irradiated with laser beams at the same time, and in the boundary portion of irradiated region, thermal diffusion in the transverse direction occurs toward the non-irradiated region. Therefore, it is expected that a loss of absorbed energy occurs in the vicinity of the boundary, and the laser beams do not contribute to the energy for explosive splitting.

Thus, metal particles other than the intended spherical metal fine particles are unfavorably mixed. In this embodiment, the metallic thin film is deposited on the rough surface of a translucent substrate such as a ground glass, not on a flat substrate, so as to hinder the thermal diffusion in the transverse direction. Thereby, the thermal connection in the transverse direction is made incomplete, and the driving force for causing explosive splitting is made less liable to be hindered.

Experiment

Figure 9:
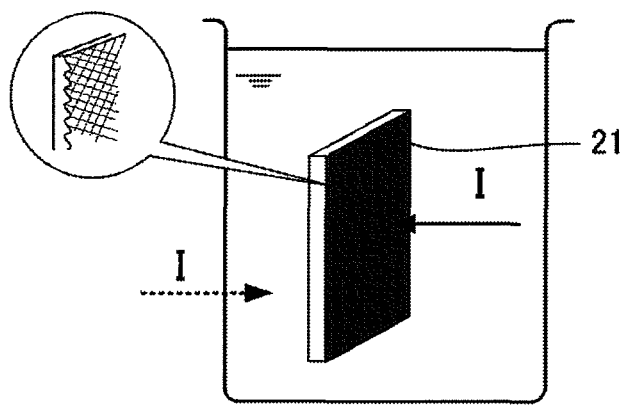
FIG. 9(a) is an explanatory view for explaining a manufacturing method for metal fine particles utilizing a ground glass.
FIGS. 9(b) to 9(d) are enlarged photographs under an optical microscope of metal fine particles manufactured by a method in accordance with a second embodiment.
Figure 9:
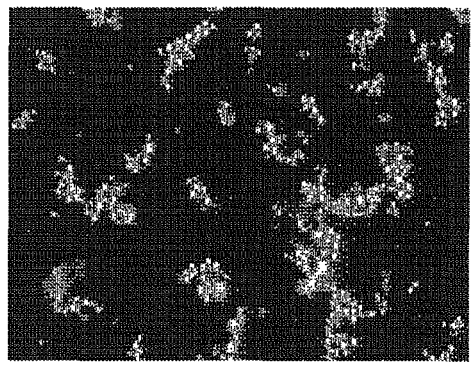
Figure 9:
Figure 9:
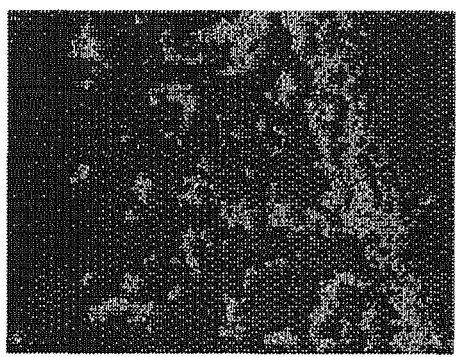

As shown in FIG. 9(a), a metallic thin film (for example, a copper thin film having a thickness of 0.1 μm) was formed on a translucent substrate, for example, a ground glass 21 by a publicly known method such as the sputtering method, and the metallic thin film was immersed in a solvent (various dispersion liquids explained in the first embodiment can be used) together with the substrate. Then, one pulse of laser beams having a wavelength of 532 nm was irradiated from the top surface (the rough surface side) or the back surface (the flat surface side) of ground glass.

As in the first embodiment, submicron particles or nano particles were yielded according to the relationship between film thickness and irradiation intensity.

FIGS. 9(b) to 9(d) show the results obtained by photographing the obtained metal fine particles under an optical microscope. FIG. 9(b) shows the case where the weight film thickness is 0.05 to 0.1 μm, FIG. 9(c) shows the case where the weight film thickness is 0.02 to 0.04 µm, and FIG. 9(d) shows the case where the weight film thickness is 0.02 µm or smaller.

As described in this embodiment, in the case where a metallic thin film is used as a starting substance, it can be thought that particle diameter control etc. can be improved in terms of the fact that precise control of the important "thickness (film thickness)" can be carried out in the present invention. Although detailed data on the roughness of ground glass were not obtained, according to the experiment, almost expected results could be obtained with a roughness on the order of approximately several tens micrometers.

Industrial Applicability

According to the manufacturing method for metal fine particles in accordance with the present invention, submicron particles or nano particles can be manufactured efficiently in large amounts. The metal fine particles obtained by the present invention each have a spherical shape closer to a complete sphere than the conventionally known nano particles, and therefore are expected to be applied to the development of new materials by making good use of the properties thereof.

As described above, the present invention can expect industrial great ripple effects, and the industrial applicability thereof is very high.

The invention claimed is:

1. A manufacturing method for metal fine particles each having a particle diameter of several tens nanometers, characterized in that laser beams having at least an energy density not lower than an energy density $E_{th2}[J/cm^2]$ necessary for allowing metallic particles to reach the vicinity of the boiling point are irradiated to the metallic particles, each having a particle diameter of several hundred nanometers, the metallic particles being dispersed in a dispersion liquid during the irradiating with the laser beams, wherein the dispersion liquid does not additionally contain a surface active agent or other protecting agent that restrains aggregation of the metal fine particles.

2. The manufacturing method for metal fine particles according to claim 1, wherein the metal fine particles formed have a substantially spherical shape.

3. The manufacturing method for metal fine particles according to claim 1, wherein the method further comprises manufacturing the metal fine particles, using, as a starting material, metallic foil pieces, the metallic foil pieces having a thickness not larger than 1 µm, and wherein the manufacturing of the metal fine particles includes irradiating laser beams directly to the metallic foil pieces, dispersed in the dispersion liquid to form the metal fine particles.

4. The manufacturing method for metal fine particles according to claim 3, wherein the metallic foil pieces are foil piece-shaped metal flakes.

5. The manufacturing method for metal fine particles according to claim 3, wherein an energy density of the laser beams irradiated directly to the metallic foil pieces, in forming the metal fine particles, is $E_{th1}[J/cm^2]$ necessary for allowing the metallic foil pieces to reach the vicinity of the melting point.

6. A manufacturing method for metal fine particles by using metallic foil pieces as a starting material, comprising a step of dispersing the metallic foil pieces in a dispersion liquid; and a step of subsequently irradiating laser beams directly to the metallic foil pieces, characterized in that the dispersion liquid is a solvent consisting of chain or cyclic ketone.

7. A manufacturing method for metal fine particles by using metallic thin films as a starting material, comprising a step of immersing a substrate the top surface of which is formed with a metallic thin film in a solvent, wherein the metallic thin film has a thickness not larger than 1 µm, and wherein the solvent is a dispersion liquid that does not additionally contain a surface active agent or other protecting agent that restrains aggregation of the metal fine particles; and a step of subsequently irradiating laser beams directly to the metallic thin film from the top surface or the back surface of the substrate.

8. The manufacturing method for metal fine particles according to claim 7, wherein the metal fine particles formed have a substantially spherical shape.

9. A manufacturing method for metal fine particles each having a particle diameter of several tens nanometers, characterized in that laser beams, having at least an energy density not lower than an energy density $E_{th2}[J/cm^2]$ necessary for allowing metallic foil pieces, having a thickness not larger than 1 µm, to reach the vicinity of the boiling point, are irradiated to the metallic foil pieces, the metallic foil pieces being dispersed in a dispersion liquid during the irradiating, wherein the dispersing liquid does not additionally contain a surface active agent or other protecting agent that restrains aggregation of the metal fine particles.

10. The manufacturing method for metal fine particles according to claim 9, wherein said metallic foil pieces are foil piece-shaped metal flakes having the thickness not larger than 1 µm.

11. A manufacturing method for metal fine particles by using metallic thin films as a starting material, comprising a step of immersing a substrate, the top surface of which is formed with a metallic thin film, in a solvent, wherein the metallic thin film has a thickness not larger than 1 µm, and wherein the solvent is a dispersion liquid that does not contain sodium dodecyl sulfate; and a step of subsequently irradiating laser beams directly to the metallic thin film from the top surface or the back surface of the substrate.

* * * * *